(12) United States Patent
Wang et al.

(10) Patent No.: US 9,879,870 B2
(45) Date of Patent: Jan. 30, 2018

(54) HVAC MODULE WITH ANTI-BACKFLOW CONTROL AND METHOD OF OPERATION

(71) Applicant: MAHLE International GmbH, Stuttgart (DE)

(72) Inventors: Mingyu Wang, East Amherst, NY (US); Yanping Xia, Williamsville, NY (US); Wen Liu, Pendleton, NY (US); Prasad S. Kadle, Williamsville, NY (US); Jeffrey C. Kinmartin, East Amherst, NY (US)

(73) Assignee: MAHLE International GmbH, Stuttgart (DE)

( * ) Notice: Subject to any disclaimer, the term of this patent is extended or adjusted under 35 U.S.C. 154(b) by 317 days.

(21) Appl. No.: 14/854,829

(22) Filed: Sep. 15, 2015

(65) Prior Publication Data

US 2016/0305676 A1    Oct. 20, 2016

Related U.S. Application Data

(63) Continuation-in-part of application No. 14/685,933, filed on Apr. 14, 2015, now Pat. No. 9,724,978.

(51) Int. Cl.
*F24F 11/00* (2006.01)
*F24F 7/08* (2006.01)
*B60H 1/00* (2006.01)

(52) U.S. Cl.
CPC ............ *F24F 7/08* (2013.01); *B60H 1/00678* (2013.01); *B60H 2001/002* (2013.01); *B60H 2001/00135* (2013.01); *B60H 2001/00192* (2013.01)

(58) Field of Classification Search
CPC ........ F24F 7/08; F24F 1/022; B60H 1/00678; B60H 1/00021; B60H 1/00064; B60H 1/00028; B60H 1/00035; B60H 2001/00185; B60H 2001/00135; B60H 2001/00192; B60H 2001/002
(Continued)

(56) References Cited

U.S. PATENT DOCUMENTS 4,974,776 A    12/1990  Oshizawa
5,228,475 A     7/1993  Trill
(Continued)

FOREIGN PATENT DOCUMENTS

EP    1 466 764 A1    10/2004
EP    2 030 816 A2     3/2009

OTHER PUBLICATIONS

Article by Kevin Cheung et al. entitled "Integrated Front and Rear HVAC Unit", SAE Technical paper 2014-01-0690, 2014, doi: 10.4271/2014-01-0690, 6 pages.

*Primary Examiner* — Davis Hwu
(74) *Attorney, Agent, or Firm* — Brinks Gilson & Lione

(57) ABSTRACT

HVAC module has an air inlet, an evaporator downstream of the blower and a heater downstream of the evaporator, and a rear mixing zone downstream of the evaporator and the heater, wherein a control valve prevents cold air from flowing back towards the hot air by regulating the pressure of the cold air. A method is devised to control anti-backflow control valve of such an HVAC module by the steps of reading pressure and temperatures at various points in the HVAC module; setting air flow and temperature discharge targets; calculating the resistance of the control valve and a bland valve; determining corresponding control valve and blend valve positions; and moving the control valve and blend valve to those corresponding positions.

14 Claims, 3 Drawing Sheets

(58) Field of Classification Search
USPC .......................................... 454/238; 165/203
See application file for complete search history.

(56) References Cited

U.S. PATENT DOCUMENTS

| | | |
|---|---|---|
| 5,983,657 A | 11/1999 | Murata et al. |
| 6,368,207 B1 | 4/2002 | McLaughlin et al. |
| 6,547,152 B1 | 4/2003 | Pawlak, III |
| 6,772,833 B2 | 8/2004 | Auer et al. |
| 7,174,918 B2 | 2/2007 | Stevenson et al. |
| 7,832,464 B2 | 11/2010 | Kinmartin et al. |
| 2013/0014931 A1 | 1/2013 | Hashigaya et al. |
| 2016/0152110 A1 | 6/2016 | Kim et al. |

HVAC MODULE WITH ANTI-BACKFLOW CONTROL AND METHOD OF OPERATION

CROSS-REFERENCE TO RELATED APPLICATIONS

The present application is a Continuation-in-Part of U.S. application Ser. No. 14/685,933, filed on Apr. 14, 2015, and entitled "AN HVAC MODULE HAVING AN OPEN ARCHITECTURE" the entire content of which is hereby incorporated by reference.

TECHNICAL FIELD OF INVENTION

The present application relates to a heating, ventilation, and air conditioning (HVAC) module for a passenger vehicle.

BACKGROUND OF THE INVENTION

Traditional motor vehicles typically have a single temperature-controlled zone air conditioning system designed to provide conditioned air to the front occupants in the passenger compartment of the vehicle. As the size of the vehicles increases, and as vehicle occupants demand more luxurious features, air conditioning systems capable of providing multiple temperature-controlled zones, or multi-zone air conditioning systems, have become more prevalent. A multi-zone air conditioning system allows the driver, front passenger, and even the rear seat passengers to have separate controls of the temperature in their respective zone, thereby improving the comfort of the occupants in each zone. A larger size vehicle, such as sport utility vehicles (SUV) and mini-vans, may have up to four or more individual zones in the passenger compartment. As an example, the passenger compartment of a mini-van may be divided into four separate zones, where the driver space may be zone 1, the front passenger space may be zone 2, the second row seating space may be zone 3, and the third row seating space may be zone 4.

Traditional heating, ventilation and air conditioning (HVAC) modules for single zone air conditioning systems are generally designed to optimally utilize the amount of available space in a given type of vehicle as well as to conform to the shape of that space. HVAC modules that have the capability of providing temperature control for multiple zones are specifically designed, tooled, and manufactured for the exact number of zones. The production volume for multiple zone HVAC modules is typically much lower than that for single or dual zone modules. As such, it is much more expensive to design such a multiple zone HVAC module for so few vehicles. Additionally, it would be disruptive to the manufacturing cell and the manufacturing process in general to be forced to build an entirely different HVAC module to achieve an additional temperature-controlled zone.

Traditional multiple zone HVAC modules use partition walls extending up to the individual heat exchangers within the HVAC module to provide multiple streams of conditioned airflow. These multiple streams of airflow are used to achieve multi-zone climate control in the associated passenger compartments. The greater the number of zones, the greater number of partition walls are required, and the larger the sizes of heat exchangers are required. However, multiple zone HVAC modules must conform to the limited size and shape where a single zone HVAC module would be in place, thereby requiring additional functions to be added without utilizing any extra space. Due to operating capacity and packaging constraints, two separate dual HVAC modules are commonly employed in larger vehicles to achieve multi-zone operation, where a two zone module is installed between the firewall and the vehicle dash and another, one or two zone, HVAC module in the area of the trunk.

However, implementation of traditional, partitioned, dual HVAC modules is challenging. For example, dual HVAC modules can require excessive packaging space in the host vehicle, additional air ducts, additional lines and fittings, additional refrigerant, additional coolant, additional mass, higher operating noise levels, higher cost and increased system complexity that often translates into elevated quality and warranty issues. Such systems require additional energy and larger supporting components such as compressors, water pump, condenser, alternator, line sets, and ducts. As a consequence, the dual module approach results in increased vehicle fuel consumption and increased exhaust emissions. All of these items significantly contribute to overall vehicle cost and operating costs.

SUMMARY OF THE INVENTION

The present disclosure provides an open architecture, multi-zone heating, ventilation, and air conditioning (HVAC) module for a passenger vehicle, having an anti-backflow control and a method for operating the anti-backflow control.

According to a first aspect of the present disclosure, an apparatus is provided for an HVAC module for a passenger vehicle comprising a housing defining an air inlet, a front zone air outlet, and a rear zone air outlet; an evaporator disposed within the housing downstream of the air inlet; a heater disposed within the housing downstream of the evaporator; a cold air chamber downstream of the evaporator defined in the housing between the evaporator and the heater, the cold air chamber having a first pressure; a hot air chamber downstream of the heater defined in the housing between the heater and a first interior surface of the housing, the hot air chamber having a second pressure quantitatively lower than the first pressure of the cold air chamber; a cold air stream path defined by a second interior surface of the housing and an interior partition in the housing, the cold air stream path extending from the cold air chamber to a rear zone mixing chamber defined by the housing, the rear zone mixing chamber having a third pressure and being in fluid communication with the rear zone air outlet; and a control valve disposed in the housing between the cold air chamber and the rear zone mixing camber, the control valve configured to controllably release cold air from the cold air chamber along the cold air stream path into the rear zone mixing chamber, wherein the control valve throttles cold air from the cold air chamber thereby regulating the third pressure of the rear zone mixing chamber such that the third pressure remains quantitatively lower than the second pressure of the hot air chamber. This prevents cold air in the cold air stream path from flowing back into the hot air chamber.

The rear zone mixing chamber may have a rear zone blend valve disposed within the rear zone mixing chamber. The rear zone blend valve may be configured to selectively direct air flow from the cold air stream and the hot air chamber to the rear air outlet.

The control valve disposed in the housing between the cold air chamber and the rear zone mixing chamber may be a butterfly valve.

The HVAC module may further comprising a front zone mixing chamber defined by the housing and positioned downstream of the evaporator adjacent to the cold air chamber and the hot air chamber. The front zone mixing chamber may be in fluid communication with the front zone air outlet.

A front zone blend valve may be disposed in the front zone mixing chamber to selectively direct air flow from the cold air chamber and the hot air chamber to the front zone air outlet.

This structure may be applied to an HVAC module having no more than one blower assembly that moves air through the housing from the inlet to the front zone air outlet and/or the rear zone air outlet.

According to another aspect of the present disclosure, a method of controlling a backflow of cold air into hot air chamber in an open architecture HVAC module is provided. The HVAC module having an air inlet, an evaporator downstream of the air inlet, a cold air chamber downstream of the evaporator, a heater downstream of the cold air chamber, a hot air chamber downstream of the heater, a rear zone mixing chamber downstream of the cold air chamber and the hot air chamber, a rear zone air outlet, a control valve disposed between the cold air chamber and the rear mixing chamber, and a blend valve disposed in the rear zone mixing chamber. The method comprising the steps of reading a pressure of the cold air chamber, a temperature of the cold air chamber via a thermistor measurement, a pressure of the hot air chamber, and a temperature of the hot air chamber; setting a discharge air flow rate target and a discharge temperature target for the rear zone air outlet; calculating a resistance of the anti-backflow control valve; calculating a resistance of the blend valve; determining a position of the anti-backflow control valve corresponding to the calculated resistance of the control valve, the determination based on pre-programmed control valve calibration data; determining a position of the blend valve corresponding to the calculated resistance of the blend valve, the determination based on pre-programmed blend valve calibration data; moving the control valve to the position of the control valve determined to correspond to the resistance of the control valve calculated; moving the blend valve to the position of the blend valve determined to correspond to the resistance of the blend valve calculated.

The pre-programmed control valve calibration data may be a control valve look-up table.

The pre-programmed blend valve calibration data may be a blend valve look-up table.

The method may be applied to an HVAC module having no more than one blower assembly configured to induce air to flow through the housing from the inlet to at least one of the front zone air outlets and/or the rear zone air outlets.

These and other features and advantages of this invention will become apparent upon reading the following specification, which, along with the drawings, describes preferred and alternative embodiments of the invention in detail.

BRIEF DESCRIPTION OF THE DRAWINGS

This invention will be further described, by way of example, with reference to the accompanying drawings in which.

Although the drawings represent embodiments of the present invention, the drawings are not necessarily to scale and certain features may be exaggerated in order to illustrate and explain the present invention. The exemplification set forth herein illustrates an embodiment of the invention, in one form, and such exemplifications are not to be construed as limiting the scope of the invention in any manner.

DETAILED DESCRIPTION OF INVENTION

Figure 1:
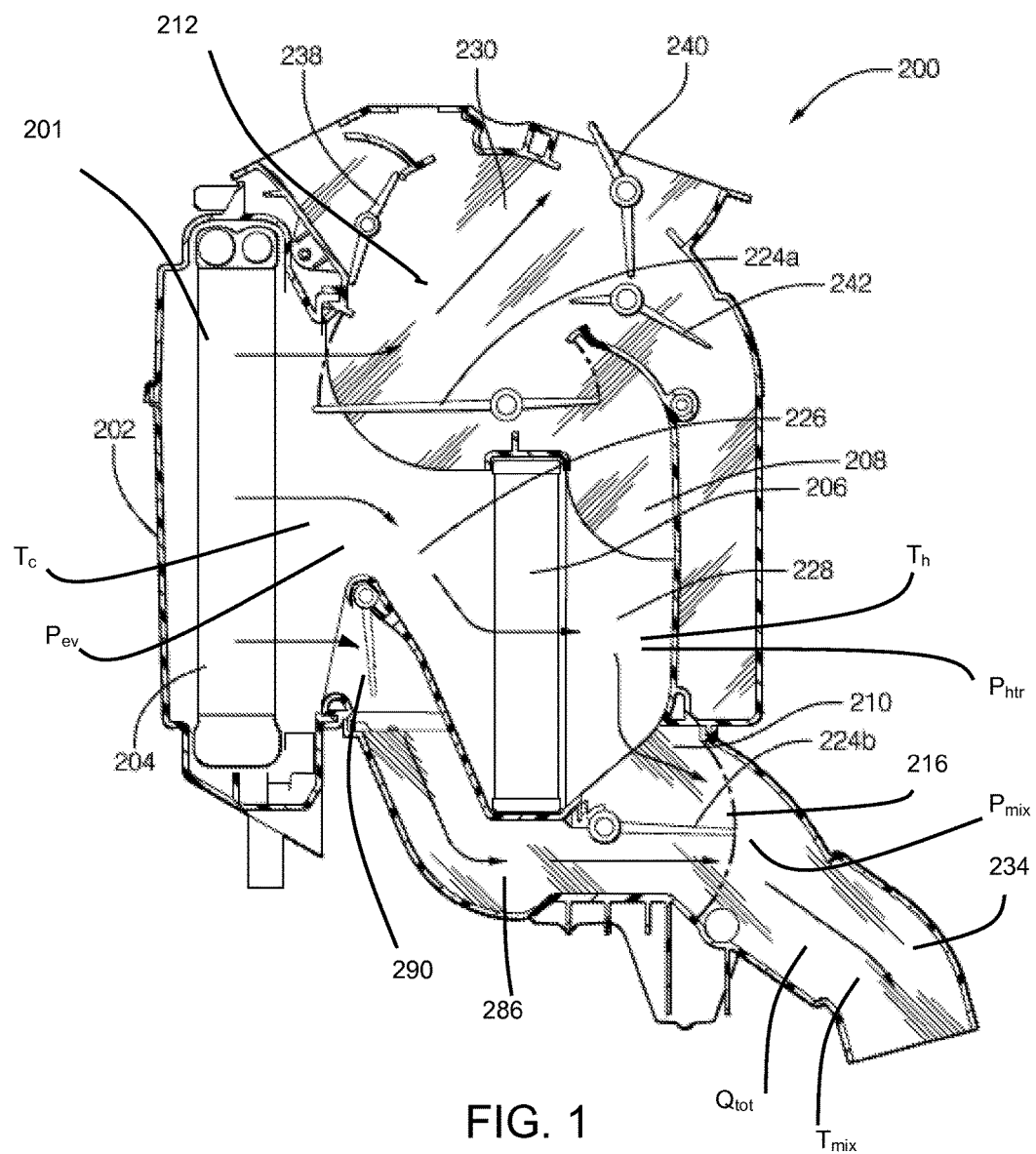
FIG. 1, illustrates a cross-sectional view of an open architecture HVAC module having an anti-backflow control valve.

Shown in FIG. 1 is one form of an HVAC module 200 having an anti-backflow control valve 290 of the present disclosure. Where practical, reference numbers for like components are commonly used among the figures. Referring to FIG. 1, the present disclosure pertains to an open architecture HVAC module 200. An open architecture HVAC module means, in part, that the cores of the heat exchangers 204, 206 are not partitioned into dedicated zones by the internal partition walls 208, 210 of the HVAC housing 202, and all or a portion of the air flow through the core of each heat exchanger 204, 206 may be intercepted by blend valves 224a, 224b, and directed to any one or more zones. In other words, the total core of each heat exchanger 204, 206, as opposed to only a portion of the core of the each heat exchanger 204, 206, can be utilized to condition the air flow to one or more of the zones at all times. Unlike the prior art HVAC modules, an open architecture HVAC module 200 enables super cooling or super heating of any one zone, or enables the delivery of different temperature air to multiple zones. Super cooling or super heating is accomplished by directing the total mass air flow (100% of air-flow) exiting the core of the evaporator 204 or heater unit 206 to any one of the multiple zones.

The improved HVAC module 200 includes an HVAC housing 202 containing an evaporator 204 and the heater unit 206 spaced from and downstream from the evaporator 204. A cold air chamber 226 is defined in the HVAC housing 202 between the evaporator 204 and heater unit 206, and a hot air chamber 228 is defined between the heater unit 206 and an interior surface of the HVAC housing 202 downstream of the heater unit 206. Air flow through the evaporator 204 exits directly into the cold air chamber 226 and air flow through the heater unit 206 exits directly into the hot air chamber 228. The HVAC housing 202 defines an air inlet 201 and four air outlets 230, 232, 234, 236; one air outlet for each of the temperature controlled zones for supplying temperature controlled air to the respective zones. In FIG. 1, the HVAC blower unit and its connection to the air inlet 201 are on the back side of the HVAC housing 202, and therefore are not shown. FIG. 1 also does not show two of the air outlets 232 and 236, but it will be understood that those air outlets 232 and 236 are directly reflected on the back side of the HVAC module 200 and are hidden behind the upper partition wall 208 and the lower partition wall 210, respectively. Two of the air outlets 230, 232 for directing conditioned air to a front zone of a vehicle, two of the air outlets 234, 236 for directing conditioned air to a rear zone of the vehicle.

The upper vertical partition wall 208, or first partition wall 208, may extend partially into the cold and hot air chambers 226, 228 from an interior surface of the HVAC housing 202 between the first outlet 230 and second outlet 232. The upper portion of the HVAC housing 202 defines a front zone mixing chamber 212 in fluid communication with the front zone air outlets 230, 232. Similarly, the lower vertical partition wall 210, or second partition wall 210, may extend partially into the cold and hot air chambers 226, 228 from an interior surface of the HVAC housing 202 between the third outlet 234 and fourth outlet 236. The lower portion of the HVAC housing defines a rear zone mixing chamber 216 in fluid communication with the rear zone air outlets 234, 236. In FIG. 1, the front zone outlets 230, 232 are adjacent the upper portion of the HVAC housing 202, and the rear zone outlets 234, 236 are adjacent the lower portion of the HVAC housing 202.

It should be noted that the improved HVAC module 200 does not include a horizontal partition wall. It should also be noted that the vertical partition walls 208, 210, if included extend only partially into the cold and hot air chambers 226, 228, and do not extend to or through the evaporator 204 and heater unit 206. Each of the mixing chambers 212, 216 is in fluid communication with both the cold air chamber 226 and hot air chamber 228. Disposed in each of the mixing chambers 212, 216, is a blend valve 224a, 224b configured to selectively divert at least a portion of air flow from the cold air chamber 226 and hot air chamber 228 to its respective air outlet 230, 232, 234, 236. It will be understood that the half of the HVAC module 200 shown in FIG. 1 is directly reflected on the back side of the HVAC module 200 behind the upper vertical partition wall 208 and lower vertical partition wall 210. Therefore there are mixing chambers and blend valves on both halves of the HVAC module 200. Only a single blower (not shown) is required to induce air through the improved HVAC module 200 to the multiple zones.

A first mode valve 238 for delivering air to the windshield, a second mode valve 240 for delivering air to the dash, and a third mode valve 242 for delivering air to the feet of the driver are shown downstream of the front zone mixing chamber 212. Downstream of the rear zone mixing chamber 216 may be mode valves (not shown) for delivering air flow to the torso or feet of the rear passengers.

The evaporator 204 is spaced from and disposed upstream of the heater unit 206 within the HVAC housing 202. The cold air chamber 226 is defined by the volume of the HVAC housing 202 between the evaporator 204 and the heater unit 206, and the hot air chamber 228 is defined by the volume of the HVAC housing 202 between the heater unit 206 and a portion of the interior surface of the HVAC housing 202 downstream of the heater unit 206.

A cold air stream path 286 is defined by a portion of the housing 202 and an interior partition in the housing. The cold air stream path 286 extends from the cold air chamber 226 to the rear zone mixing chamber 216. The cold air stream path 286 is the path that cold air takes to move from the cold air chamber 226 to the rear zone mixing chamber 216.

As mentioned, a single blower assembly is provided to draw air into the HVAC module 200 to be conditioned and conveyed to the individual zones. The mass flow rate and velocity of air flow to each zone may be controlled by the combination of the speed of the blower and airflow control valves provided in the vent outlet to each of the zones. The blower assembly may draw in a stream of air external to the vehicle or a stream of recycle air from within the vehicle.

The temperature blend valves 224a, 224b of each mixing chamber may selectively intercept one of the hot and cold air streams, or a combination of both, from the cold and hot air chambers 226, 228, respectively, to provide the desired temperature to the zones. The zonal specific airflow rate after mixing is controlled by a coordination of the blower, of the respective current mode valve position, and the balancing of other zonal mode valves 238, 240, 242. A benefit of this open architecture is that the total capacity of the evaporator 204 and heater unit 206 may be utilized to condition the air for any one of the zones, as well as providing variable air flow to the zones. Another benefit is that by selectively opening and closing the airflow control valves, the total air flow through the heat exchangers 204, 206 may be directed to any one of the zones. The mode valves 238, 240, 242 may be coordinated to direct up to 100 percent of the zone one air flow to one of the defrost vents, passenger vents, or floor outlets.

The cold air chamber 226 has a pressure $P_{ev}$ and a temperature $T_c$. The hot air chamber 228 has a pressure $P_{htr}$ and a temperature $T_h$. The rear zone mixing chamber has a pressure $P_{mix}$. For the purpose of the present disclosure, the rear zone air outlet 234 has a target discharge air flow rate $Q_{tot}$ and target discharge temperature $T_{mix}$. As a general rule, the pressure $P_{ev}$ of the cold air chamber 226 is always quantitatively greater than the pressure $P_{htr}$ of the hot air chamber 228 due to the added resistance of passing through the heater 206.

It has been discovered that in certain limited circumstances, cold air from the cold air stream path 286 reaches the rear zone mixing chamber 216 and flows back into hot air chamber 228. This occurs when the rear zone blend valve 224b is in a position to provide nearly all cold air to the rear zone air outlet 234 and the front zone blend valve 224a is in a position to provide nearly all hot air to the front zone air outlets, with the front zones demanding high airflow rates. This position of the rear zone blend valve 224b places little resistance on the cold air stream, thereby increasing the pressure $P_{mix}$ in the rear zone mixing chamber 216, while such a position of the front zone blend valve 224a and the required high flow rates causes the pressure $P_{htr}$ to decrease. When $P_{mix}$ increases to become closer to $P_{ev}$ and $P_{htr}$ decreases, $P_{mix}$ becomes quantitatively greater than $P_{htr}$. In this situation, cold air from the cold air stream path 286 reaches the rear zone mixing chamber 216 and then flows back toward to the hot air chamber 228. This cold air mixes with the hot air in the hot air chamber 228, thereby cooling the air in the hot air chamber 228 and reducing the temperature of the air flowing to the front zone air outlets.

It is thus desirable to reduce or prevent the backflow from the cold air stream path 286 to the hot air chamber 228. Utilizing an anti-backflow control valve 290 between the cold air chamber 226 and the rear zone mixing chamber 216 to control the release of cold air from the cold air chamber 226 regulates the pressures of the HVAC module by creating a pressure drop in the cold air stream path 286. Thus, the anti-backflow valve 290 helps to maintain the pressure $P_{mix}$ of the rear zone mixing chamber such that it is quantitatively less than the pressure $P_{htr}$ of the hot air chamber 228. The anti-backflow valve 290 increases the resistance on the cold air along the cold air stream path 286 by throttling air from the cold air chamber 226, thereby decreasing the pressure of the cold air as it moves to the rear zone mixing chamber 216. The anti-backflow control valve 290 may act independently of the fluid communication of the hot air chamber to the rear zone mixing chamber such that the control valve 290 does not affect the cross section of the fluid communication between the hot air chamber 228 and the rear zone mixing chamber 216. Where the mixing valve is controllable by the HVAC system itself, it may be feasible to replace the rear zone blend valve 224b with two separately operable valves, of which one is dedicated to the cold air stream path 286 and the other one to the hot air exiting the hot air chamber 228. The separate anti-backflow control valve 290 in addition to the rear zone blend valve 224b as shown in FIG. 1, however, is suited for all arrangements, including those, in which the rear zone blend valve 224b is externally controlled and inaccessible to the HVAC control.

Figure 2:
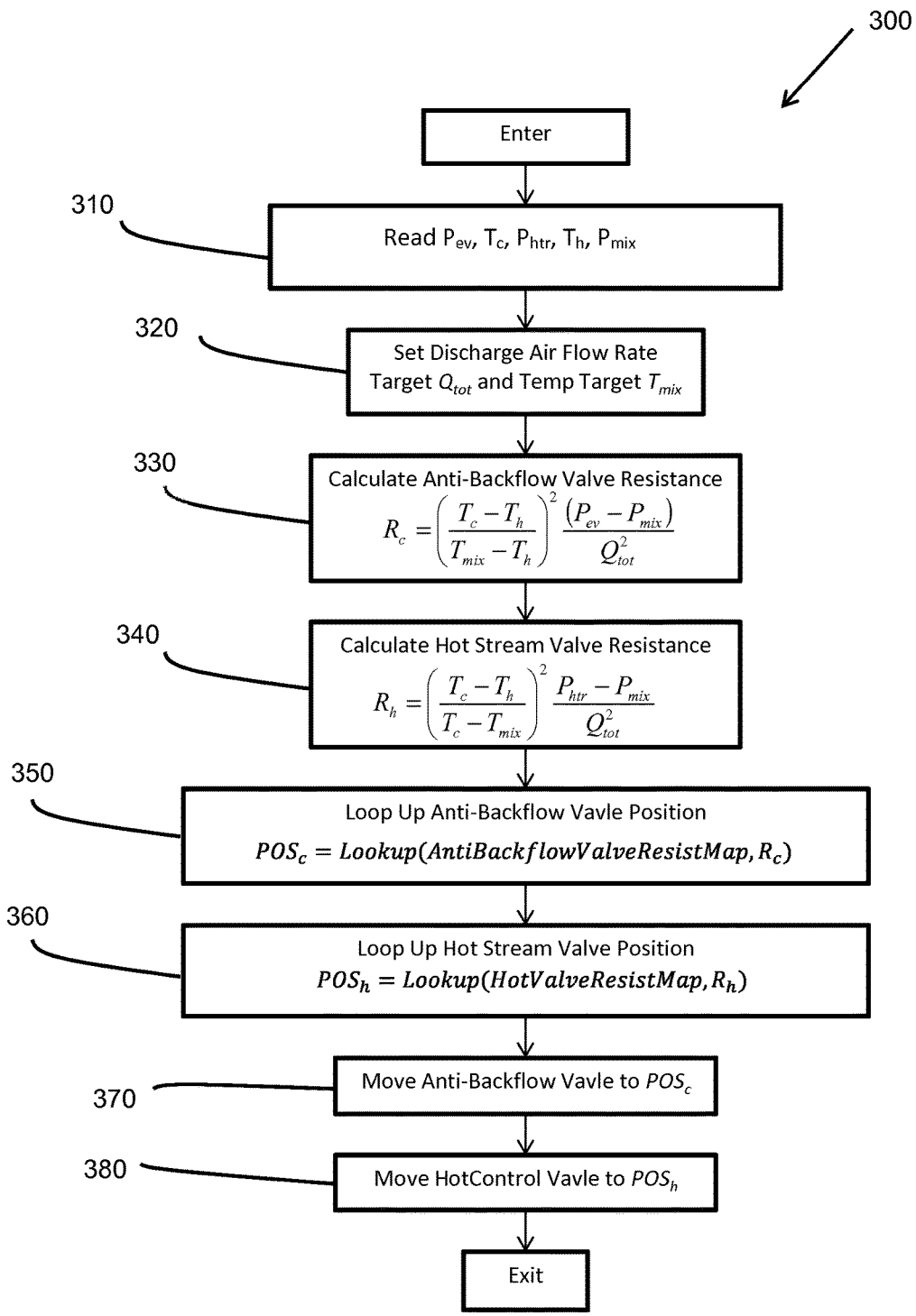
FIG. 2, is a flowchart illustrating a method for preventing back flow of air in the HVAC module of FIG. 1 by controlling an anti-backflow control valve and a blend valve.

FIG. 2 illustrates a method for operating 300 an anti-backflow control valve 290 of an open architecture HVAC module as shown in FIG. 1. The method begins by reading a pressure of the cold air chamber $P_{ev}$, a temperature of the cold air chamber $T_c$, a pressure of the hot air chamber $P_{htr}$, a temperature of the hot air chamber $T_h$, and a pressure of the rear zone mixing chamber $P_{mix}$ at step 310. Next, a discharge air flow rate target $Q_{tot}$ and a discharge temperature target $T_{mix}$ are set for the rear zone air outlet at step 320. The method continues by calculating a resistance $R_c$ of the anti-backflow control valve at step 330 and calculating a resistance $R_h$ of the rear zone blend valve at step 340. The resistance $R_c$ of the anti-backflow control valve may be calculated by Equation 1, while the resistance $R_h$ of the rear zone blend valve may be calculated by Equation 2. The method may be incorporated into an open architecture, multi-zone HVAC system such as the system and method of control described in U.S. patent application Ser. No. 14/801,862 which is hereby incorporated by reference in its entirety.

$$R_c = \left(\frac{T_c - T_h}{T_{mix} - T_h}\right)^2 \frac{P_{ev} - P_{mix}}{Q_{tot}^2} \quad \text{Equation 1}$$

$$R_h = \left(\frac{T_c - T_h}{T_c - T_{mix}}\right)^2 \frac{P_{htr} - P_{mix}}{Q_{tot}^2} \quad \text{Equation 2}$$

Alternatively, starting with an initial control valve position and a blend valve position, the resistance of the control valve $R_c$ and the resistance of the rear zone blend valve $R_h$ can be looked up from the pre-calibrated tables. The discharge air flow rate $Q_{tot}$ and a discharge temperature $T_{mix}$ may be calculated according to Equation 3 and Equation 4, respectively, and may be compared with the target temperature and flow rate to re-position the valves via a method proportional-integral-derivative (PID) control.

$$Q_{tot} = \left(\frac{P_{htr} - P_{mix}}{R_h}\right)^{\frac{1}{2}} + \left(\frac{P_{ev} - P_{mix}}{R_c}\right)^{\frac{1}{2}} \quad \text{Equation 3}$$

$$T_{mix} = \left(\frac{P_{ev} - P_c}{R_c}\right)^{\frac{1}{2}} \frac{T_c}{Q_{tot}} + \left(\frac{P_{htr} - P_c}{R_h}\right)^{\frac{1}{2}} \frac{T_h}{Q_{tot}} \quad \text{Equation 4}$$

The method continues at step 350 by determining a position of the control valve $POS_c$ corresponding to the calculated resistance of the control valve $R_c$. The determination is based on referencing pre-programmed control valve calibration data. The pre-programmed control valve calibration data may be in the form of a look-up table, as shown in Table 1.

TABLE 1

| Control Valve Position | $Pos_c$ (0) | $Pos_c$ (1) | $Pos_c$ (2) | $Pos_c$ (3) | $Pos_c$ (4) | $Pos_c$ (5) | $Pos_c$ (6) | $Pos_c$ (7) | $Pos_c$ (8) | $Pos_c$ (9) | $Pos_c$ (10) |
|---|---|---|---|---|---|---|---|---|---|---|---|
| Control Valve Resistance | $R_c$ (0) | $R_c$ (1) | $R_c$ (2) | $R_c$ (3) | $R_c$ (4) | $R_c$ (5) | $R_c$ (6) | $R_c$ (7) | $R_c$ (8) | $R_c$ (9) | $R_c$ (10) |

The method continues at step 360 by determining a position of the rear zone blend valve $POS_h$ corresponding to the calculated resistance of the rear zone blend valve $R_h$. The determination is based on referencing pre-programmed control valve calibration data. The pre-programmed rear zone blend valve calibration data may be in the form of a look-up table, as shown in Table 2.

TABLE 2

| Rear Zone Blend Valve Position | $Pos_h$ (0) | $Pos_h$ (1) | $Pos_h$ (2) | $Pos_h$ (3) | $Pos_h$ (4) | $Pos_h$ (5) | $Pos_h$ (6) | $Pos_h$ (7) | $Pos_h$ (8) | $Pos_h$ (9) | $Pos_h$ (10) |
|---|---|---|---|---|---|---|---|---|---|---|---|
| Rear Zone Blend Valve Resistance | $R_h$ (0) | $R_h$ (1) | $R_h$ (2) | $R_h$ (3) | $R_h$ (4) | $R_h$ (5) | $R_h$ (6) | $R_h$ (7) | $R_h$ (8) | $R_h$ (9) | $R_h$ (10) |

At step 370, the method includes moving the control valve to the position of the control valve $POS_c$ determined to correspond to the resistance of the control valve $R_c$ calculated. Step 380 includes moving the rear zone blend valve to the position of the rear zone blend valve $POS_h$ determined to correspond to the resistance of the blend valve $R_h$ calculated.

Figure 3:
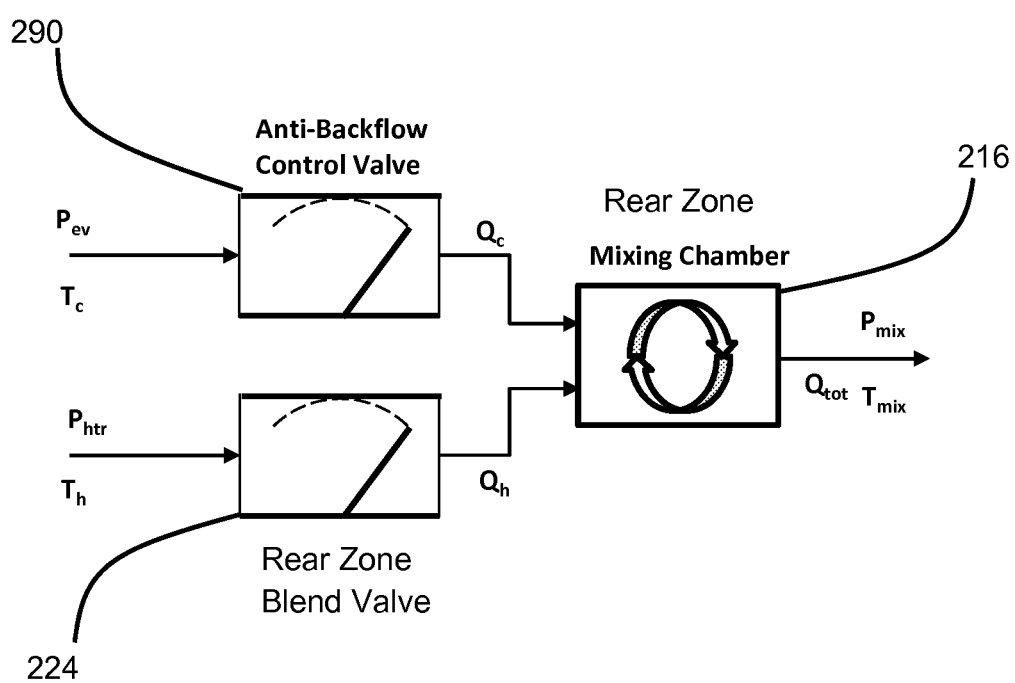
FIG. 3, is a schematic illustrating valves controlled by the method of FIG. 2.

FIG. 3 is a schematic illustrating valves controlled by the method of FIG. 2. Based on the pressure of the cold air chamber $P_{ev}$ and the temperature of the cold air chamber $T_c$, the anti-backflow control valve 290 is positioned to result in a cold air flow $Q_c$. The rear zone blend valve is 224b is positioned based on the pressure of the hot air chamber $P_{htr}$ and the temperature of the hot air chamber $T_h$, and results in a hot air flow $Q_h$. The cold air flow $Q_c$ and the hot air flow $Q_h$ mix in the rear mixing chamber 216 to result in a rear zone mixing chamber pressure $P_{mix}$ and a discharge air flow $Q_{tot}$ and discharge temperature $T_{mix}$.

It is to be understood that the invention has been described with reference to specific embodiments and variations to provide the features and advantages previously described and that the embodiments are susceptible of modification as will be apparent to those skilled in the art.

What is claimed is:

1. An HVAC module, comprising:
a housing defining an air inlet, a front zone air outlet, and a rear zone air outlet;
an evaporator disposed within the housing downstream of the air inlet;
a heater disposed within the housing downstream of the evaporator;
a cold air chamber downstream of the evaporator defined in the housing between the evaporator and the heater, the cold air chamber having a first pressure;
a hot air chamber downstream of the heater defined in the housing between the heater and a first interior surface of the housing, the hot air chamber having a second pressure quantitatively lower than the first pressure of the cold air chamber, the hot air chamber being in fluid communication with a rear zone mixing chamber defined by the housing, the rear zone mixing chamber having a third pressure and being in fluid communication with the rear zone air outlet;
a cold air stream path defined by a second interior surface of the housing and an interior partition in the housing, the cold air stream path extending from the cold air chamber to the rear zone mixing chamber; and
a control valve disposed in the housing between the cold air chamber and the rear zone mixing camber, the control valve configured to selectively control a release of cold air from the cold air chamber along the cold air stream path into the rear zone mixing chamber so as to control backflow of cold air into the hot chamber.

2. The HVAC module of claim 1, wherein the control valve throttles cold air from the cold air chamber thereby regulating the third pressure of the rear zone mixing chamber such that the third pressure remains quantitatively lower than the second pressure of the hot air chamber.

3. The HVAC module of claim 2, wherein the control valve acts independently of the fluid communication of the hot air chamber to the rear zone mixing chamber, such that the control valve does not affect the cross section of the fluid communication between the hot air chamber and the rear zone mixing chamber.

4. The HVAC module of claim 1, further comprising a rear zone blend valve disposed at an entrance of the rear zone mixing chamber, wherein the rear zone blend valve is configured to selectively direct air flow from the cold air stream and the hot air chamber to the rear air outlet.

5. The HVAC module of claim 1, wherein the control valve disposed in the housing between the cold air chamber and the rear zone mixing chamber is a butterfly valve.

6. The HVAC module of claim 1, wherein the control valve disposed in the housing between the cold air chamber and the rear zone mixing chamber is a flap valve.

7. The HVAC module of claim 1, further comprising a front zone mixing chamber defined by the housing and positioned downstream of the evaporator adjacent to the cold air chamber and the hot air chamber, the front zone mixing chamber being in fluid communication with the front zone air outlet.

8. The HVAC module of claim 7, further comprising a front zone blend valve disposed in the front zone mixing chamber, wherein the front zone blend valve is configured to selectively direct air flow from the cold air chamber and the hot air chamber to the front zone air outlet.

9. The HVAC module of claim 1, further comprising no more than one blower assembly configured to induce air to flow through the housing from the inlet to at least one of the front zone air outlet and the rear zone air outlet.

10. A method of controlling a backflow of cold air into hot air chamber in an open architecture HVAC module having an air inlet, an evaporator downstream of the air inlet, a cold air chamber downstream of the evaporator, a heater downstream of the cold air chamber, a hot air chamber downstream of the heater, a rear zone mixing chamber downstream of the cold air chamber and the hot air chamber, a rear zone air outlet, a control valve disposed between the cold air chamber and the rear mixing chamber, and a blend valve disposed in the rear zone mixing chamber, the method comprising the steps of:
reading a pressure of the cold air chamber, a temperature of the cold air chamber, a pressure of the hot air chamber, a temperature of the hot air chamber, and a pressure of the rear zone mixing chamber;
setting a discharge air flow rate target and a discharge temperature target for the rear zone air outlet;
calculating a resistance of the control valve;
calculating a resistance of the blend valve;
determining a position of the control valve corresponding to the calculated resistance of the control valve, the determination based on pre-programmed control valve calibration data;
determining a position of the blend valve corresponding to the calculated resistance of the blend valve, the determination based on pre-programmed blend valve calibration data;
moving the control valve to the position of the control valve determined to correspond to the resistance of the control valve calculated;
moving the blend valve to the position of the blend valve determined to correspond to the resistance of the blend valve calculated.

11. The method of claim 10, wherein the pre-programmed control valve calibration data is a control valve look-up table.

12. The method of claim 10, wherein the pre-programmed blend valve calibration data is a blend valve look-up table.

13. The method of claim 10, further comprising reading the position of the control valve, and the position of the blend valve, determining the resistance of the control valve based on pre-programmed control valve calibration data can be looked up from the pre-calibrated tables, determining and the resistance of the rear zone blend valve based on pre-programmed blend valve calibration data, calculating a discharge air flow rate, calculating a discharge temperature, comparing the calculated discharge air flow rate and the discharge temperature to the discharge air flow rate target and the discharge temperature target, and moving at least one of the control valve and rear zone blend valve.

14. The method of claim 10, wherein the HVAC module has no more than one blower assembly configured to induce air to flow through the housing from the inlet to both the front zone air outlet and the rear zone air outlet.

* * * * *